Nov. 14, 1961 A. F. ERICKSON 3,008,546
DISK BRAKE ADJUSTER
Original Filed Jan. 18, 1956 3 Sheets-Sheet 1

INVENTOR.
Anton F. Erickson
BY
HIS ATTORNEY

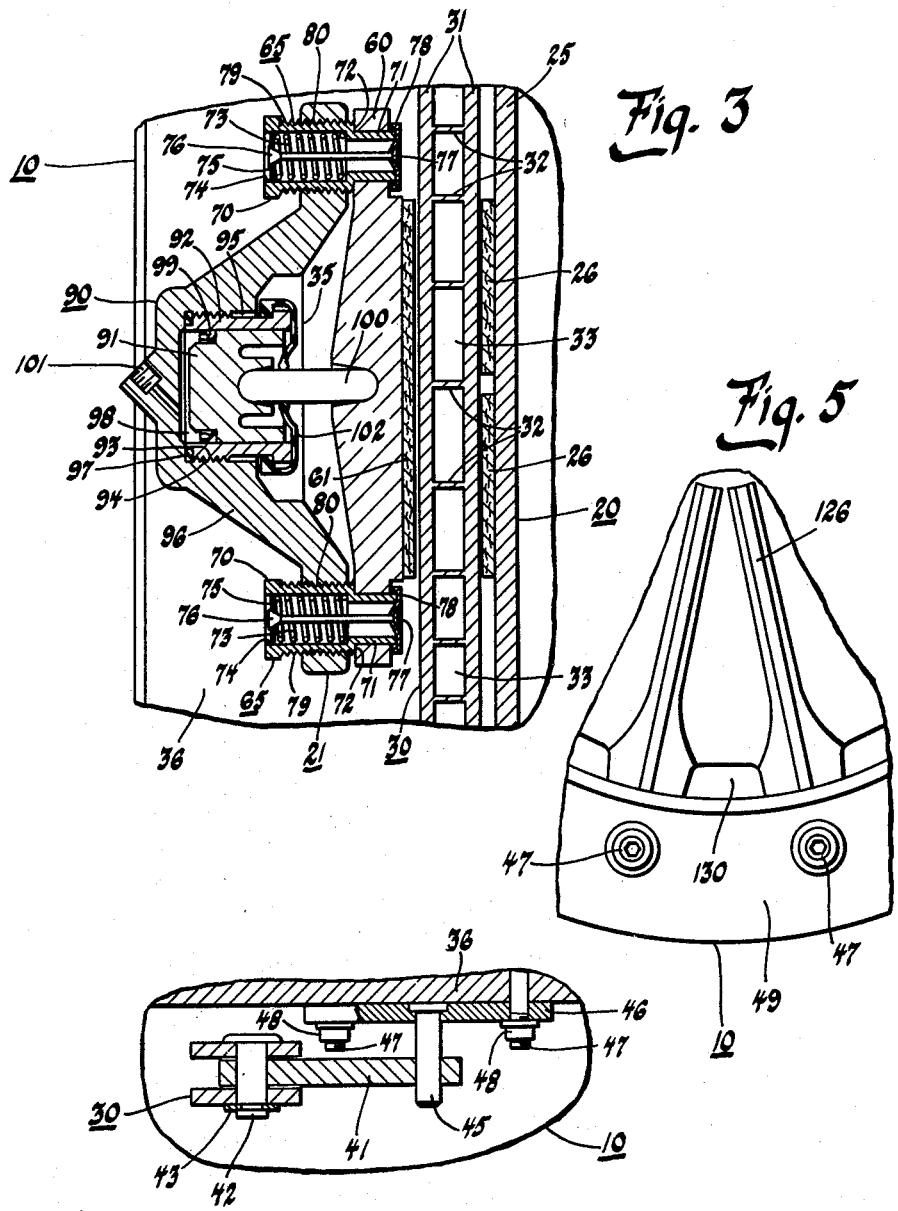

United States Patent Office 3,008,546
Patented Nov. 14, 1961

1

**3,008,546
DISK BRAKE ADJUSTER**
Anton F. Erickson, Dayton, Ohio, assignor to General Motors Corporation, Detroit, Mich., a corporation of Delaware
Original application Jan. 18, 1956, Ser. No. 559,971, now Patent No. 2,940,548, dated June 14, 1960. Divided and this application Nov. 27, 1959, Ser. No. 855,876
3 Claims. (Cl. 188—71)

This invention relates to a disk brake for motor vehicles.

This application is a division of Anton F. Erickson's application Serial No. 559,971 for Disk Brake, filed January 18, 1956, now Patent No. 2,940,548, granted June 14, 1960.

An object of the invention is to provide an improved structural arrangement of a disk brake in which the brake disk is carried by the wheel of the vehicle, a plurality of suspension links being provided between the wheel and the disk to provide for relative movement between the disk and the wheel while concurrently effecting driving of the disk from the wheel.

Another object of the invention is to provide an adjusting mechanism and brake shoe retraction unit by which a constant spring pressure is applied to the brake shoe for retraction of the shoe when it is released irrespective of any adjustment of the shoe relative to the brake disk.

Still another object of the invention is to provide a hydraulic cylinder and piston arrangement for actuating the movable shoe of the brake wherein the cylinder is provided with a removable lining of a material substantially different from the housing that supports the cylinder. More specifically, the housing that supports the cylinder is made of a light weight material such as aluminum whereas the cylinder sleeve that supports the actuating piston is made from a material that provides a good bearing surface between the actuating piston and the cylinder wall.

Another object of the invention is to provide a light weight brake housing for a disk brake that incorporates a removable bridge to effect strengthening of the housing and also provide a closure cap for the live end of a wheel spindle.

Further objects and advantages of the present invention will be apparent from the following description, reference being had to the accompanying drawings, wherein a preferred form of the invention is clearly shown.

In the drawings:

FIGURE 3 is a partial cross sectional view taken along line 3—3 of FIGURE 1 illustrating the adjusting mechanism for the brake.

FIGURE 4 is a partial cross sectional view taken along line 4—4 of FIG. 1 illustrating the connecting link between the brake disk and the wheel of the vehicle.

FIGURE 5 is an elevational view of a portion of the vehicle wheel.

Figure 1:
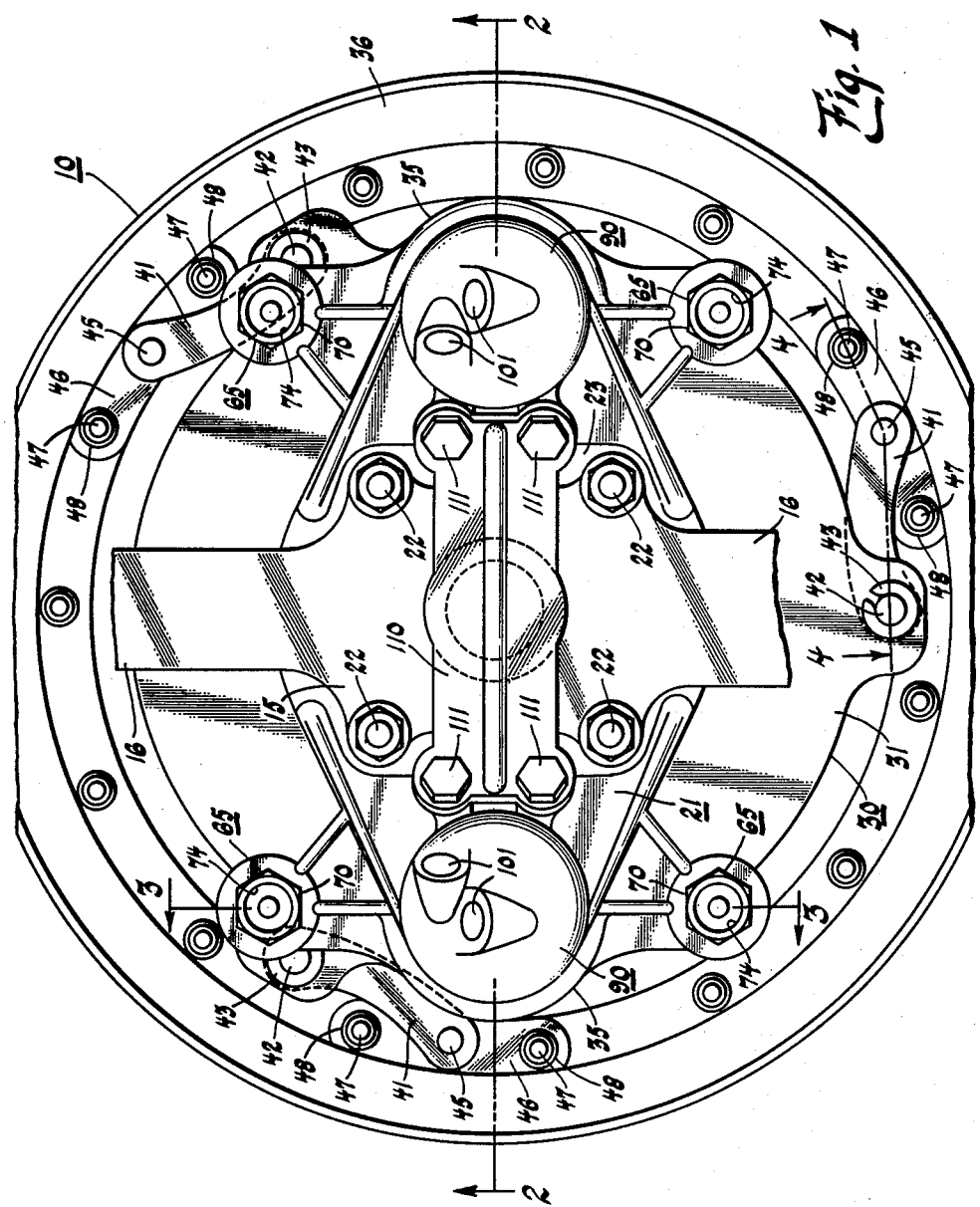
FIGURE 1 is an elevational rear view of a brake structure incorporating features of this invention.
Figure 2:
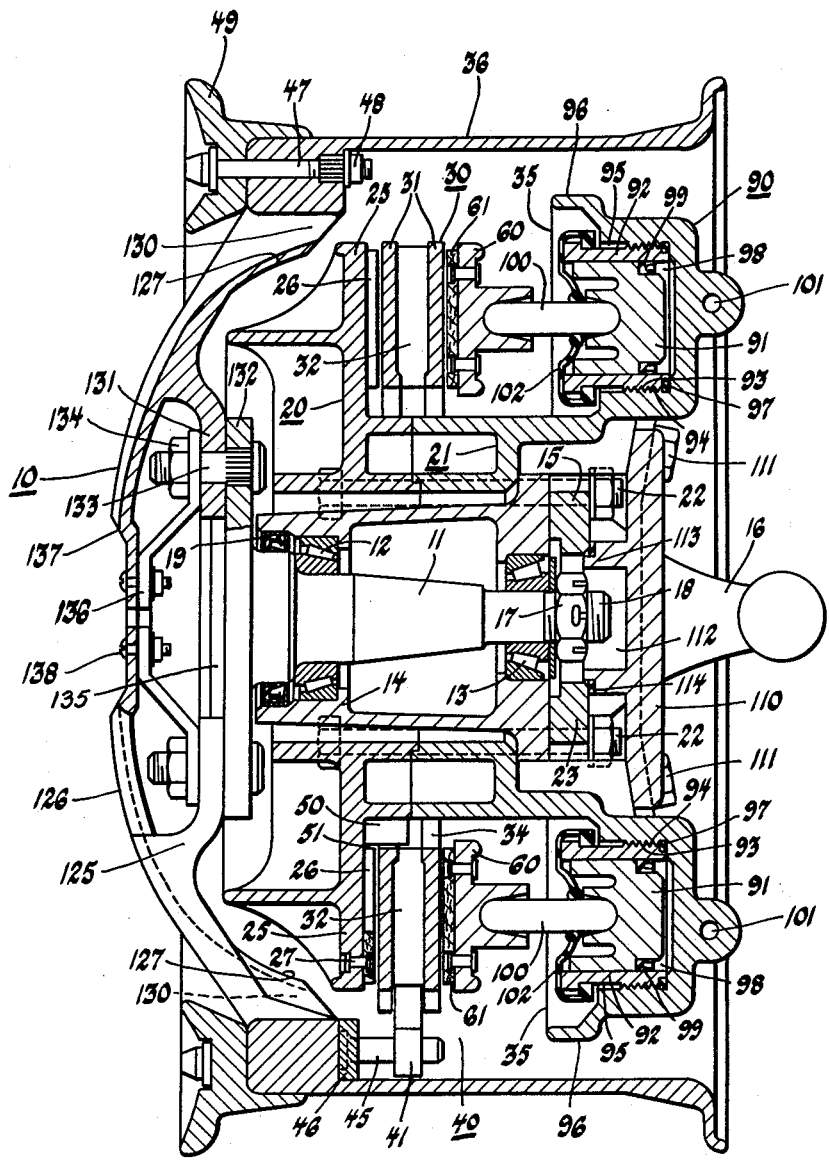
FIGURE 2 is a transverse cross sectional view of the brake structure taken along line 2—2 of FIG. 1.

In this invention the motor vehicle wheel 10 carries a live spindle 11 that is supported upon the anti-friction bearings 12 and 13. The bearings 12 and 13 are supported within a hub 14 that is connected to a steering knuckle support plate 15. The steering knuckle support plate 15 is attached to the motor vehicle by the arms 16 in conventional manner to provide for steering of the wheel 10.

The spindle 11 is held within the hub and bearing assembly by means of a nut 17 provided on the threaded end 18 of the spindle 11. A suitable grease seal 19 is provided between the hub 14 and the spindle 11 to prevent loss of lubricant from within the hub.

The disk brake of this invention comprises a two-part housing formed by an outboard housing part 20 and an inboard housing part 21. The housing parts 20 and 21 are secured together by means of the bolts 22 that also extend through the flange 23 of the hub 14, whereby the brake housing 20, 21 is stationarily mounted on the stationary hub 41.

The housing part 20 has a radially extending wall 25 on opposite sides of the axis of the spindle. The walls 25 support friction elements 26 that are adapted to be engaged by one side of a rotating brake disk 30. Suitable friction materials, such as compounded organic friction lining materials or metallic elements can be used for the friction elements 26. The friction elements 26 are suitably attached to the housing walls 25, rivets 27 being illustrated as the attaching means in the drawing.

The housing part 21 has radially extending walls 35 that are substantially parallel with the radially extending walls 25 of the housing part 20 and provide therebetween a space 40 in which the brake disk 30 is placed.

The brake disk 30 consists of a disk member having spaced wall portions 31 disposed in parallel relation and held in this relationship by radially extending ribs 32, whereby to provide radial air passages 33 between the wall portions 31. The disk 30 has a central opening 34 through which air passes to enter the radial air passages 33. Air passing through the disk 30 removes heat from the walls 31.

The disk 30 is supported upon the rim 36 of the vehicle wheel 10 by means of three link members 41. One end of the link members 41 is connected with the brake disk 30 by means of a pin 42, the link element 41 being straddled by the walls 31 as more particularly shown in FIG. 4. The pin 42 is retained in the brake disk 30 by means of a retaining washer 43. The opposite end of the link 41 is carried upon a pin 45 that projects from a plate 46 carried between a pair of studs 47. The inner ends of the studs are threaded for insertion into the retaining nuts 48 whereby to hold the flanged annulus 49 on the rib 36.

The wheel 10 is removable from the hub 14 upon removal of the retaining nut 17 on the spindle 11, the links 41 being slidable axially of the pins 45 to allow for removal of the wheel from the brake assembly.

To prevent the disk 30 from dropping relative to the axle 11 when the wheel is removed from the hub, there is provided a plurality of projections 50 that are spaced within the interior of the brake disk, a very small clearance space 51 being provided between the projections 50 and the internal diameter of the brake disk 30 to prevent any substantial movement of the brake disk relative to the brake housing under this circumstance, The brake disk 30, which incidentally is in the form of an annulus, is engaged by movable brake shoes 60 which carry friction elements 61 that are similar to the friction elements 26. Each of the brake shoes 60 is supported upon a pair of anchor members 65, as more particularly shown in FIG. 3, the brake shoes being movable axially of the anchor members 65 to effect engagement with the brake annulus 30 and move it into engagement with the friction elements 26 on the brake housing. The brake annulus 30 is therefore movable relative to the vehicle wheel 10 that supports the brake annulus, this movement being concurrent with a braking operation.

Each of the anchor members 65 includes a retraction element to return the movable brake shoes 60 into a retracted position out of engagement with the brake annulus 30 and includes a structural arrangement by which the anchor members 65 also provide the necessary adjustment for moving the brake shoes 60 relative to the brake annulus 30 to establish the desired minimum operating clearance between the brake disk and the friction elements of the brake.

The anchor members 65 each consists of a thimble 70 that has a reduced diameter portion 71 that supports the brake shoe 60 and on which the brake shoe is slidable axially of the thimble. The reduced diameter portion 71 of the thimble 70 provides a shoulder 72 against which the brake shoe 60 is held by means of a retraction spring 73 that is contained within the annular bore 74 of the thimble 70. One end of the retraction spring 73 is engaged by the cap 75 through which a headed nail 76 extends. The opposite end of the nail 76 has a headed end 77 that engages a cap 78 that in turn engages the shoe 60 to hold the shoe against the shoulder 72 of the thimble 70.

The thimble 70 has a threaded external periphery 79 that is received in a threaded opening 80 in the housing wall 35 whereby the thimble 70 can be moved axially relative to the wall 35 and thereby adjust the position of the brake shoe 60 relative to the brake disk 30. The adjustment can be made without in any way affecting the degree of compression of the retraction spring 73 so that the action of the retraction spring can be predetermined and pre-established and will be unchanged during the life of the brake linings irrespective of the position of the adjusting member in making adjustments to take care of lining wear.

The movable brake shoe 60 is actuated by means of hydraulic elements 90 that include a piston 91 operating within a cylinder 92. The cylinder 92 has a threaded end portion 93 that is received in a threaded portion 94 of a cavity 95 provided in a boss 96 of the housing element 21. A seal 97 is provided between the removable cylinder 92 and the bottom of the cavity 95 to prevent loss of fluid from the hydraulic fluid chamber 98 provided between the piston 91 and the bottom of the cavity 95. A piston seal member 99 is carried by the piston 91. An actuating pin 100 extends between the piston 91 and the movable shoe 60 to effect actuation of the brake shoe in response to movement of the piston 91. Hydraulic fluid under pressure from a conventional master cylinder (not shown) is supplied through the port opening 101 to effect operation of the piston 91. A rubber cup 102 extends between the removable cylinder 92 and the pin 100 to prevent entrance of dirt into the cylinder 92.

Since the cylinder 92 is detachable from the housing part 21, the cylinder can be made of a material that is a good bearing material in which the piston 91 slides, and which is of the desired density to prevent loss of fluid under pressure from the high pressure fluid chamber 98, the material of the cylinder 92 also being one which will have a high strength coefficient to permit the cylinder wall to be relatively thin and still maintain strength against bursting under high hydraulic pressures created in the chamber 98 during operation of the hydraulic master cylinder.

The hydraulic elements 90 that provide the wheel cylinders, as conventionally known, are placed on opposite sides of the spindle 11 on the inboard side of the wheel 10, the cylinders 90 being exposed to air passing by the wheel 10. To provide for a light weight construction of the housing member 21, and yet secure rigidity of the housing against deflection effected by operation of the brake when hydraulic pressure is delivered into the actuating units 90, a bridging member 110 is secured by means of bolts 111 between the wheel cylinder bosses 96. The bridging member 110 covers the inboard end of the spindle 11 and has a cavity 112 receiving the end of the spindle. The cavity 112 has a forward wall 113 that engages the steering knuckle support plate 15 to completely close the inboard end of the spindle 11 and prevent loss of grease from the spindle. A suitable gasket 114 is provided between the wall 113 and the support 15.

The wheel 10 comprises the previously mentioned rim portion 36 that is integral with the wheel disk 125, the disk and the rim being cast as a one-piece structure. The wheel disk 125 has a plurality of radial ribs 126 between each of which the disk 125 has an inwardly recessed portion 127 that is spaced from the rim portion 36 whereby to provide an air passage opening 130 that is adjacent the outer periphery of the brake disk 30, air being adapted to pass through the openings 130 into engagement with the brake disk 30 to aid in cooling the disk.

The wheel disk 125 is also provided with an annulus portion 131 that supports the wheel 10 on the axle flange 132 of the axle 11, studs 133 and nuts 134 being provided for demountably securing the wheel 10 to the axle flange 132. An annular protrusion 135 centralizes the wheel disk 125 on the axle flange for concentricity with the axle 11.

A bracket 136 is mounted upon one of the studs 133, a cover plate 137 being supported upon the bracket 136 by the retaining screws 138. The cover plate encloses the nuts 134 and provides for access to them.

While the form of embodiment of the invention as herein disclosed constitutes a preferred form, it is to be understood that other forms might be adopted as may come within the scope of the claims which follow:

What is claimed is as follows:

1. In a disk brake, the combination of, a stationary support, a rotatable disk adjacent said support, a brake shoe between said support and said disk and engageable with said disk, an anchor means slidably supporting said shoe for movement relative to said disk, said anchor means comprising a sleeve carried in said support and axially movable relative to the same, said sleeve having a shoulder, said shoe being carried on said sleeve and engaging said shoulder, spring means within said sleeve having means extending into engagement with said shoe to retain the same against said shoulder of said sleeve, spring means and shoe being movable simultaneously relative to said support without effecting change in compression of said spring.

2. In a disk brake, comprising in combination, a stationary support, a rotatable disk adjacent to said support, a brake shoe between said support and said disk engageable with said disk, an anchor means slidably supporting said shoe for relative movement relative to said disk, said anchor means comprising a sleeve threadedly engaging said support member to permit axial movement of said sleeve relative to said support member upon adjustment, said sleeve having a shoulder, said shoe being supported on said anchor means and engaging said shoulder of said sleeve, a second shoulder within the inner periphery of said sleeve for engaging a spring, a spring retainer on the opposite end of said spring, said spring received within the hollow portion of said sleeve, a pin extending concentrically through said spring retainer and said spring to engage a cap, said cap contacting said brake shoe to bias said brake shoe in a contacting position on the shoulder on the outer periphery of said sleeve, said anchor means thereby providing a constant spring tension on said brake shoe regardless of the adjusted position of said anchor means.

3. In a disk brake, comprising in combination, a stationary support, a rotatable disk adjacent said support, a brake shoe between said support and said disk and engageable with said disk, an anchor device having threaded means for adjusting said anchor device relative to said support member, said anchor device including a sleeve having a shoulder, said shoulder on said outer periphery of said sleeve for engaging said brake shoe, a shoulder on the inner periphery of said sleeve to provide a seating portion for a retraction spring, a spring retainer on the opposite end of said spring for engaging a pin, said pin received concentrically within said sleeve and extending through said spring retainer and said spring to engage a cap, said cap mounted for engagement with said brake shoe to bias said brake shoe in a contacting position on said shoulder of the outer periphery of said sleeve, thereby providing a constant retraction spring tension for said brake shoe regardless of the adjusted position of said anchor device.

References Cited in the file of this patent
UNITED STATES PATENTS

| | | |
|---|---|---|
| 1,933,208 | Cotal | Oct. 31, 1933 |
| 2,260,189 | Morrison | Oct. 21, 1941 |
| 2,830,681 | Schilling | Apr. 15, 1958 |
| 2,840,193 | Mann et al. | June 24, 1958 |

FOREIGN PATENTS

| | | |
|---|---|---|
| 263,969 | Great Britain | Jan. 13, 1927 |